United States Patent [19]

Moriyasu et al.

[11] Patent Number: 4,908,778
[45] Date of Patent: Mar. 13, 1990

[54] INDUCTIVE INFERENCE METHOD FOR OBTAINING RULES REPRESENTED BY PROPOSITIONAL LOGIC

[75] Inventors: Takashi Moriyasu; Hiroyuki Mizutani, both of Yokohama, Japan

[73] Assignee: Kabushiki Kaisha Toshiba, Kawasaki, Japan

[21] Appl. No.: 250,995

[22] Filed: Sep. 27, 1988

Related U.S. Application Data

[63] Continuation of Ser. No. 890,552, Jul. 30, 1986, abandoned.

[30] Foreign Application Priority Data

Aug. 2, 1985 [JP] Japan .............................. 60-170762

[51] Int. Cl.$^4$ ............................................. G06F 15/18
[52] U.S. Cl. ..................................... 364/513; 364/300; 364/200; 364/274; 364/274.1; 364/274.2; 364/274.3; 364/274.5
[58] Field of Search ......... 364/300, 513, 200 MS File, 364/900 MS File

[56] References Cited

U.S. PATENT DOCUMENTS

| | | | |
|---|---|---|---|
| 4,517,468 | 5/1985 | Kemper et al. ...................... | 290/52 |
| 4,591,983 | 5/1986 | Bennett et al. ...................... | 364/513 |
| 4,620,286 | 10/1986 | Smith et al. ........................ | 364/200 |
| 4,628,434 | 12/1986 | Tashiro et al. ..................... | 364/300 |
| 4,628,435 | 12/1986 | Tashiro et al. ..................... | 364/300 |
| 4,642,782 | 2/1987 | Kemper et al. ..................... | 364/550 |
| 4,670,848 | 6/1987 | Schramm ............................ | 364/200 |
| 4,675,829 | 6/1987 | Clemenson .......................... | 364/513 |
| 4,680,802 | 7/1987 | Nishida et al. ..................... | 382/8 |
| 4,700,317 | 10/1987 | Watanabe et al. ................... | 364/488 |
| 4,730,259 | 3/1988 | Gallant ............................. | 364/513 |
| 4,777,585 | 10/1988 | Kokawa et al. ..................... | 364/164 |

FOREIGN PATENT DOCUMENTS 8505711 12/1985 United Kingdom ................. 364/300

OTHER PUBLICATIONS

Avron Barr; "*Applications-Oriented AI Research*", The hand book of Artificial Intelligence, vol. II, 185-201, pp. 203-221, '82.
Beverly A. Thompson, "Inside an Expert System", Byte, Apr./85, vol. 10, No. 4, pp. 315-330.
Bruce D'Ambrosio, "Insight-A Knowledge System", Byte, Apr./85, vol. 10, No. 4, pp. 345-347.
Expert Systems, vol. 2, No. 1, Jan. 1985, pp. 24-28. Oxford, GB; A. Hart: "The Role of Induction in Knowledge Elicitation", p. 25, left-hand column, lines 20-56.
Generalization as Search: Artificial Intelligence 18, 203-226; Mitchell, T. M.; 1982.
Learning Problem-Solving Heuristics through Practice, IJCAI 7, 124-134; Mitchell, T. M. et al; 1982.

*Primary Examiner*—Gareth D. Shaw
*Assistant Examiner*—Kevin A. Kriess
*Attorney, Agent, or Firm*—Oblon, Spivak, McClelland, Maier & Neustadt

[57] ABSTRACT

An inductive inference apparatus comprises an input section for inputting a proposition, conditions for the proposition, and the tendency of each condition, a storage section for storing the proposition, and necessary and sufficient conditions of the proposition, a condition detecting section for forming the necessary and sufficient conditions for the truth or falsity of the proposition in accordance with the input proposition, the input conditions, and the input tendency of each condition, a judging section for, with respect to an example in which the truth or falsity of the proposition is unknown, judging the truth or falsity of the proposition using already stored necesary and sufficient conditions, and a control section for, when the truth or falsity of the proposition in a new example input to the input section is known, supplying the conditions of the proposition and the tendency of each condition to the condition detecting section to store the necessary and sufficient conditions formed by the condition detecting section in the storage section, and for, when the truth or falsity of the proposition in the example is unknown, supplying the conditions of the proposition to the judging section.

4 Claims, 6 Drawing Sheets

| $c_1$ | $c_2$ | $c_3$ | $c_4$ | $c_5$ | $c_6$ |
|---|---|---|---|---|---|
| COUGH | NORMAL BODY TEMPERATURE | MORE THAN 40 YEARS OLD | DIARRHEA | NORMAL BLOOD PRESSURE | MALE |
| (I) | (II) | (III) | (I) | (II) | (III) |
| F | T | F | T | F | T |
| $\rightarrow c_1$ | $\rightarrow \sim c_2$ | $\rightarrow c_3$ | | | $\rightarrow \sim c_6$ |

$$NC = c_1 \vee \sim c_2 \vee\ c_3 \vee \sim c_6$$
$$NC(e) \leftarrow NC(e) \wedge (c_1 \vee \sim c_2 \vee c_3 \vee \sim c_6)$$

| e |
|---|
| INFLUENZA |
| F |

F I G. 5

INDUCTIVE INFERENCE METHOD FOR OBTAINING RULES REPRESENTED BY PROPOSITIONAL LOGIC

This application is a continuation of application Ser. No. 06/890,552, filed on July 30, 1986, now abandoned.

BACKGROUND OF THE INVENTION

The present invention relates to an inductive inference method which can induce expert knowledge necessary for knowledge information processing, from a proposition, and an example of various conditions for deriving that proposition.

Extracting expert knowledge in a field of expertise is necessary for knowledge information processing.

Conventionally, expert knowledge of a field of interest is extracted and registered in advance by the user. For this reason, when a great deal of expert knowledge must be extracted or when its logical structure is complicated, it is very difficult for the user to extract the desired expert knowledge, resulting in considerable labor.

Extracted expert knowledge often includes incorrect knowledge or excludes important knowledge. Such a problem causes serious errors in knowledge information processing.

When expert knowledge is extracted as described above, well-trained knowledge engineers who extract expert knowledge from the expert of the field of interest are required. The establishment of the expert knowledge necessary for knowledge information processing as a data base requires considerable labor, cost, and time.

SUMMARY OF THE INVENTION

The present invention has been made in consideration of the above situation and has as its object to provide an inductive inference method which can induce expert knowledge for a proposition, which becomes true in accordance with some combination of various conditions, from examples of a field of interest, and can effectively obtain expert knowledge required for its information processing.

In order to achieve the above object, an inductive inference method of the present invention comprises:

input means for inputting a proposition, conditions for the proposition, and the tendency of each condition;

storage means for storing the proposition, and necessary and sufficient conditions of the proposition;

condition detecting means for forming the necessary and sufficient conditions for the truth or falsity of the proposition in accordance with the input proposition, the input conditions, and the input tendency of each condition;

judging means for, with respect to an example in which the truth or falsity of the proposition is unknown, judging the truth or falsity of the proposition using already stored necessary and sufficient conditions; and control means for, when the truth or falsity of the proposition in a new example input to said input means is known, supplying the conditions of the proposition and the tendency of each condition to said condition detecting means to store the necessary and sufficient conditions formed by said condition detecting means in said storage means, and for, when the truth or falsity of the proposition in the example is unknown, supplying the conditions of the proposition to said judging means.

More specifically, in accordance with the tendency of each condition associated with the truth or falsity of the proposition, the conditions for obtaining the truth of the proposition are classified, if each condition is true, into (1) a condition for the truth of the proposition, (2) a condition for the falsity of the proposition, and (3) other conditions. The necessary condition and sufficient condition for the truth of the proposition can be induced from these conditions as expert knowledge.

According to the present invention, from an example associated with a proposition, expert knowledge necessary for knowledge information processing of a proposition can be extracted as sufficient condition and necessary condition for the truth of that proposition. Therefore, unlike a conventional method which deduces expert knowledge in a field of interest from the expert knowledge which is stated by experts, the exclusion of important knowledge or extraction of incorrect knowledge can be avoided.

Expert knowledge necessary for knowledge information processing can be easily acquired to provide sufficient condition and necessary condition for the truth of a proposition simply by inputting an example in the field of interest. Therefore, time and labor necessary for accumulating the expert knowledge to maintain in the data base can be greatly reduced, resulting in great practical advantages.

BRIEF DESCRIPTION OF THE DRAWINGS

Other objects and advantages will be apparent from the following description taken in conjunction with the accompanying drawings, in which.

DETAILED DESCRIPTION OF THE PREFERRED EMBODIMENT

Figure 1:
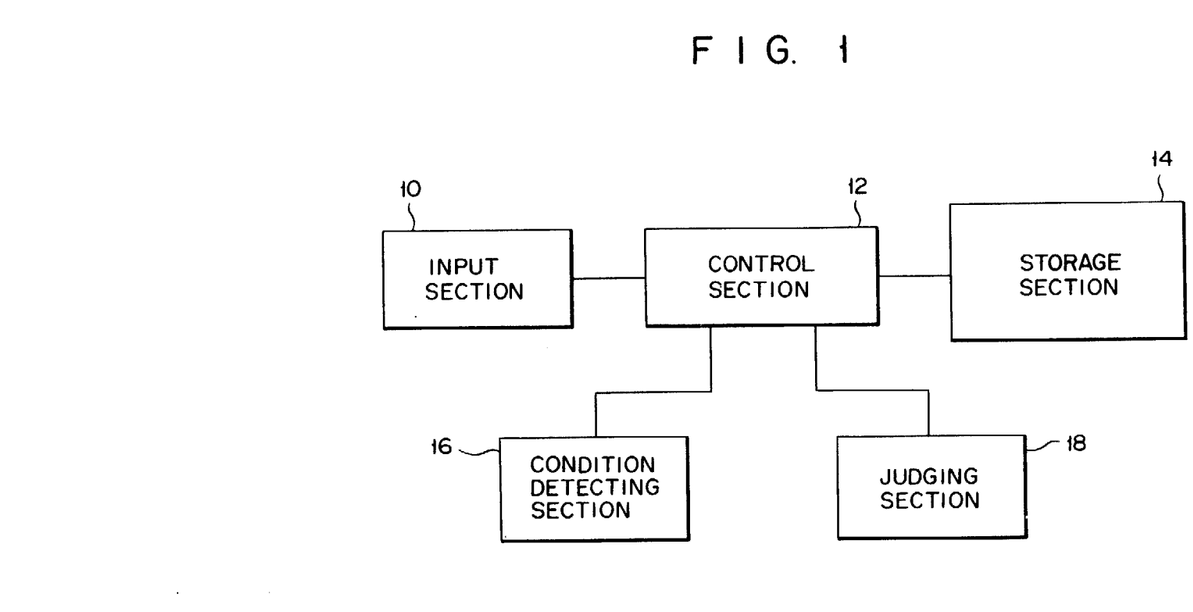
FIG. 1 is a block diagram of an inducing apparatus according to the present invention.

An inductive inference apparatus according to an embodiment of the present invention will now be described with reference to FIG. 1. The inductive inference apparatus comprises input device 8, for example, a key board input section 10 for inputting various pieces information, control section 12 for controlling the various processing of input information, memory 14 for storing the processed information as a data base, and condition detecting section 16, and judging section 18 for executing information processing and output device 20 for outputting the judged result. Propositions, various conditions for each proposition, and the tendency of each of the various conditions are manually input to input section 10 by using a key board memory. 14 stores the propositions, as well as necessary condition and sufficient condition for each proposition. Condition detecting section 16 forms necessary condition and sufficient condition associated with the truth or falsity of the proposition in accordance with the input proposition, various conditions, and tendency of each of the various conditions.

Judging section 18 judges the truth or falsity of the proposition, about which the truth or falsity is unknown, by using the already stored necessary and sufficient conditions. Control section 12 controls the operation of input section 10, memory 14, condition detecting section 16, and judging section 18. When the truth or falsity of a new proposition input to input section 10 is known, control section 12 supplies the various conditions of the proposition and the tendency of each condition to condition detecting section 16, and stores the updated necessary condition and sufficient condition in memory 14. When the truth or falsity of the proposition is unknown, control section 12 supplies the various conditions of the proposition to judging section 18 to determine the truth or falsity of the proposition.

With the apparatus of this embodiment, the necessary condition and sufficient condition for determining the truth of a proposition are induced, based on the tendency of each of the various conditions, from an example of the proposition, which is true under the combination of various conditions.

Note that various conditions for determining the truth or falsity of proposition e are indicated by $c_1, c_2, \ldots, c_n$.

When the tendency of each of various conditions $c_i$ ($i=1, 2, \ldots, n$) for determining the truth or falsity of proposition e is examined, conditions $c_i$ can be classified as follows:

(1) a condition for reasoning proposition e as true when proposition e is true and condition $c_i$ is true [tendency (I)];

(2) a condition for reasoning proposition e as false when proposition e is false although condition $c_i$ is true [tendency (II)]; and (3) other conditions [tendency (III)].

These tendencies (I), (II) and (III) are classified by users before the tendencies are input in a computer.

Figure 2:
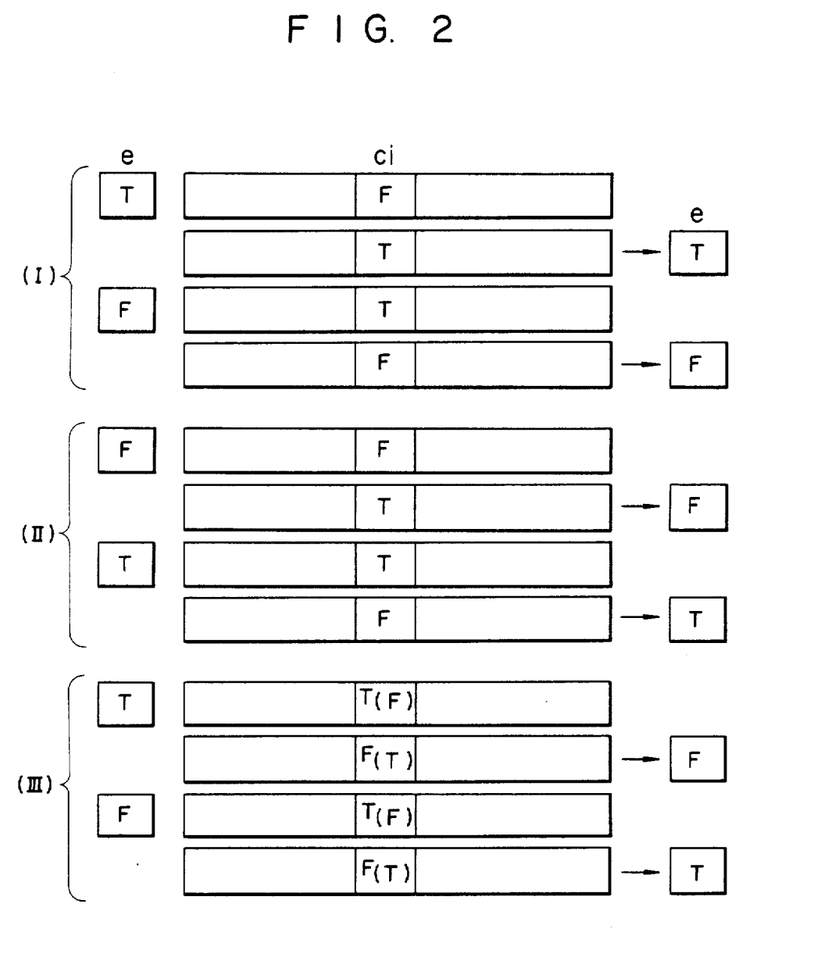
FIG. 2 is a representation showing the tendency of conditions $c_i$.

FIG. 2 illustrates the above concept. Assume that condition $c_i$ is false (F), and that proposition e is true (T). If condition $c_i$ is proved to be T and other conditions $c_j$ ($j \neq i$) are not changed, then tendency (I) of condition $c_i$ positively supports T of proposition e.

Conversely, assume that condition $c_i$ is T, and that proposition e is F. Since T of condition $c_i$ does not contribute to T of proposition e, even if condition $c_i$ is proved to be F, tendency (I) of condition $c_i$ cannot change F of proposition e to T thereof.

Assume that condition $c_i$ is F, and that proposition e is F. Even if condition $c_i$ is proved to be T, as long as other conditions $c_j$ ($j \neq i$) are not changed, tendency (II) of condition $c_i$ does not contribute to T of proposition e.

In other words, if condition $c_i$ is T and proposition e is T, tendency (II) cannot change T of proposition e to F thereof by T of condition $c_i$. Therefore, even if condition $c_i$ is proved to be F, tendency (II) cannot change T of proposition e to F thereof. That is, tendency (II) supports F of proposition e.

The tendency of condition $c_i$ which is different from tendency (I) and tendency (II) is defined as tendency (III). In this apparatus, examples associated with proposition e are input from input section 10 as information representing truth or falsity of proposition e, conditions $c_1, c_2, \ldots, c_n$ for determining the truth or falsity of proposition e, and the tendency of each of conditions $c_1, c_2, \ldots, c_n$. The information is stored in storage section 14 as a series of information associated with the truth or falsity of proposition e.

Condition detecting section 16 obtains the necessary condition and sufficient condition for the truth of proposition e from the examples associated with proposition e input and stored in memory 14 as follows.

Figure 3:
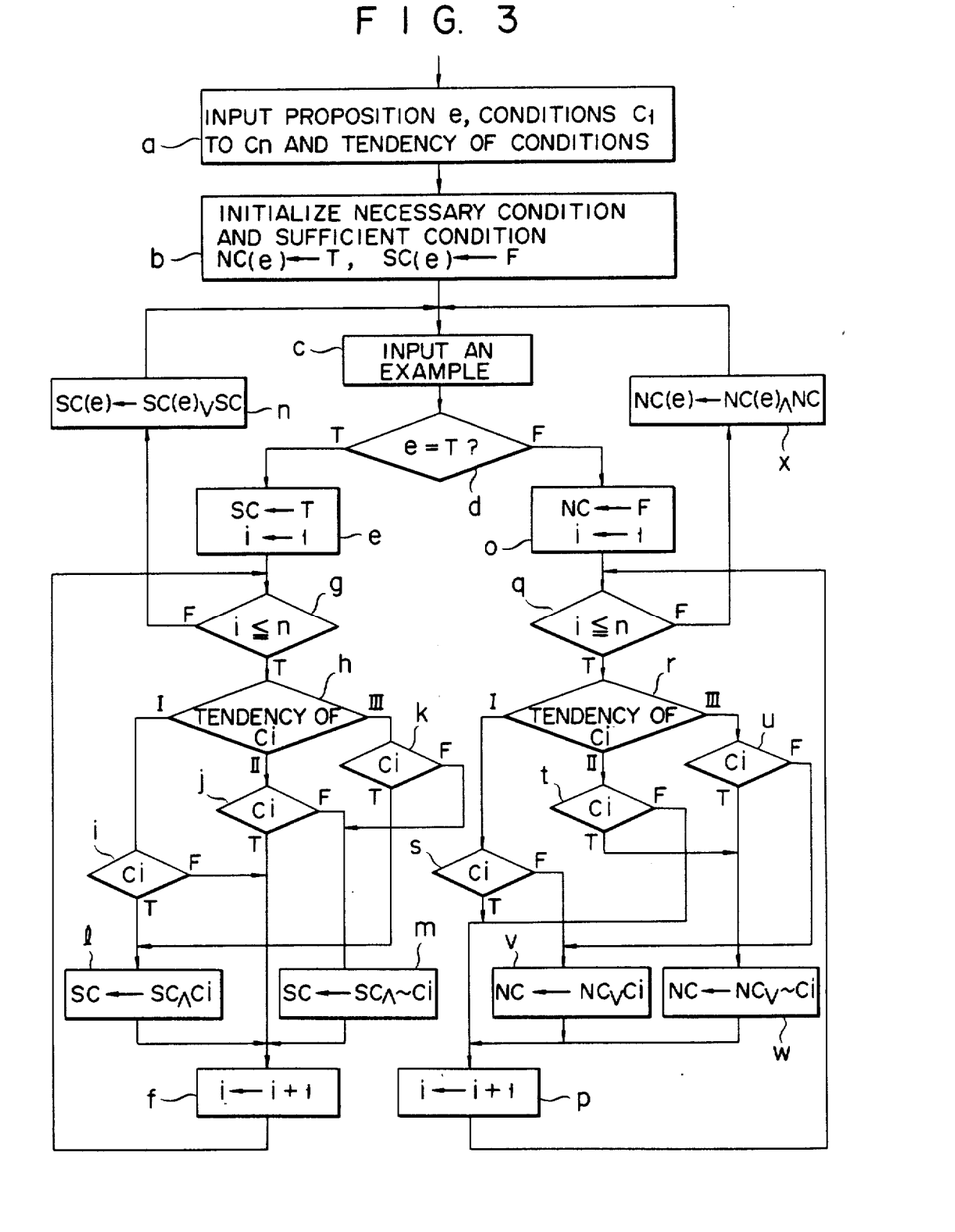
FIG. 3 is a flow chart of condition detecting processing of the present invention.

FIG. 3 is a flow chart of this processing in condition detecting section 16. In this processing, information of proposition e, conditions $c_1, c_2, \ldots, c_n$, and the tendency of each condition are read from memory 14 in step a. Necessary condition NC(e) and sufficient condition SC(e) associated with proposition e are initialized in step b, thus completing pre-processing.

Thereafter, it is checked in step $c_1$ whether or not another any remaining examples are. If yes, an example associated with proposition e is read into condition detecting section 16 in step $c_1$, and it is checked in step d whether proposition e in the example is T or F. The processing is divided as follows in accordance with the truth and falsity of proposition e.

First, processing for T of proposition e will be described.

In this case, information SC for the sufficient condition and processing parameter i are initialized in step e, and information associated with conditions $c_i$ is sequentially obtained in accordance with parameter i. Processing parameter i is sequentially incremented in step f, so that this processing is repeated until processing with respect to conditions $c_1$ to $c_n$ is completed (step g).

Next, the tendency of each condition $c_i$ in accordance with parameter i is determined in step h, and it is then checked in steps i, j, and k in accordance with the determined tendency whether condition $c_i$ is true or false.

More specifically, if condition $c_i$ has tendency (I) and is T, the logical product (AND) of information on condition $c_i$ is sequentially obtained as information SC for the sufficient condition, in step l.

If condition $c_i$ has tendency (II) and is F, the logical product of logically negated information on condition $c_i$ is sequentially obtained as information SC for the sufficient condition, in step m.

Assume that condition $c_i$ has tendency (III). The logical product of the information is obtained when condition $c_i$ is true, and that of the logically negated information is obtained when condition $c_i$ is false, in steps l and m.

When information SC for the sufficient condition is obtained from all conditions $c_i$, all logical sums (OR) of the information, i.e., sufficient condition SC(e) for the truth of proposition e, are obtained in step n. Thereafter, when another any remaining example does not exist in step $c_1$, sufficient condition SC(e) obtained is stored in memory 14. Then, sufficient condition detecting step is completed.

When proposition e is F, the following processing is performed.

In this case, information NC for the necessary condition and processing parameter i are initialized in step o, and information associated with conditions $c_i$ is obtained in accordance with parameter i. This processing is repeated until all the processing with respect to conditions $c_1$ to $c_n$ is completed, while incrementing parameter i (steps p and q).

Next, the tendency of each condition $c_i$ read out based on parameter i is determined in step r, and it is checked in steps s, t, and u in accordance with the determined tendency whether each condition $c_i$ is true or false.

More specifically, if condition ci has tendency (I) and is F, the logical sum (OR) of the information on condition ci is sequentially obtained as information NC for the necessary condition, in step v.

If condition ci has tendency (II) and is T, the logical sum of the logically negated information on condition ci is sequentially obtained as information NC for the necessary condition, in step w.

In addition, assume that condition ci has tendency (III). The logical sum of the information is obtained when condition ci is F, and that of the logically negated information is obtained when it is T, in steps v and w.

After information NC for the necessary condition is obtained from all conditions ci, all logical products (AND) of the information, i.e., necessary condition NC(e) for the truth of proposition e, are obtained in step x.

Thereafter, when another any remaining example does not exist in step $c_1$, necessary condition NC(e) obtained is stored in memory 14. Then necessary condition detecting step is completed.

The above processing is to perform induction, in accordance with the tendency of each of conditions c1, c2, ..., cn for proposition e, whether conditions c1, c2, ..., cn obtained from the example are sufficient conditions or necessary conditions for the truth of proposition e. That is, conditions ci are classified in accordance with the tendency of each condition ci whether or not condition ci reasons proposition e for T if condition ci is T, or whether or not condition ci reasons proposition e for F if condition ci is T, or whether or not condition ci has the other tendency, and these classifications are summarized. Therefore, the truth or falsity of the condition indicates the necessary or sufficient condition for determining the truth or falsity of proposition e.

Figure 4A:
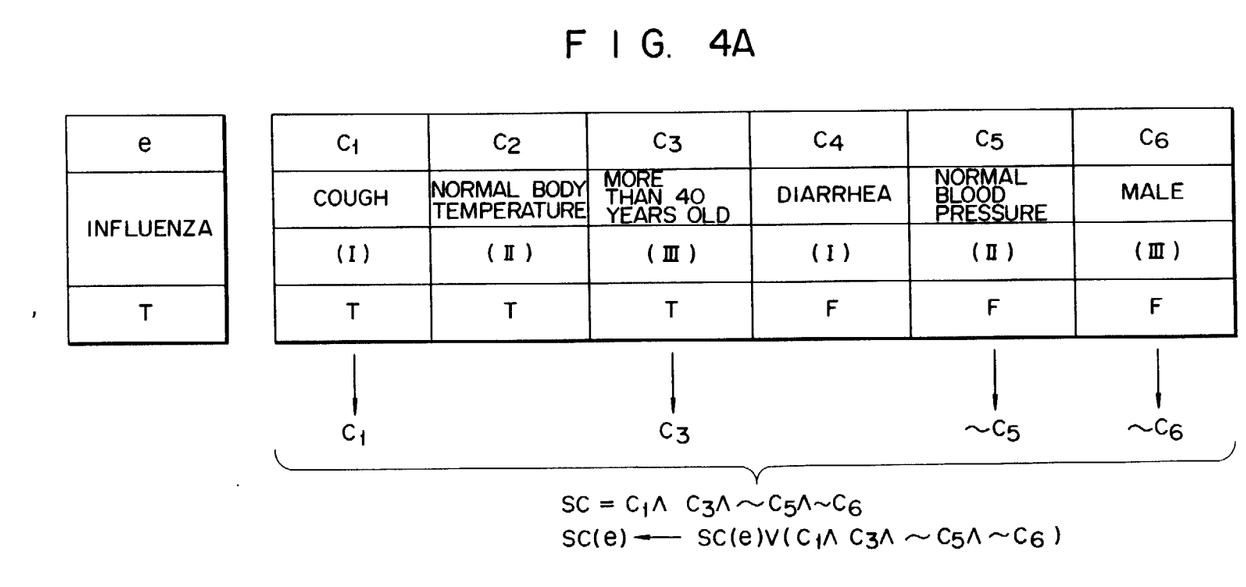
FIG. 4A is a table of a detailed example for obtaining a sufficient condition using the apparatus of the present invention.
Figure 4B:
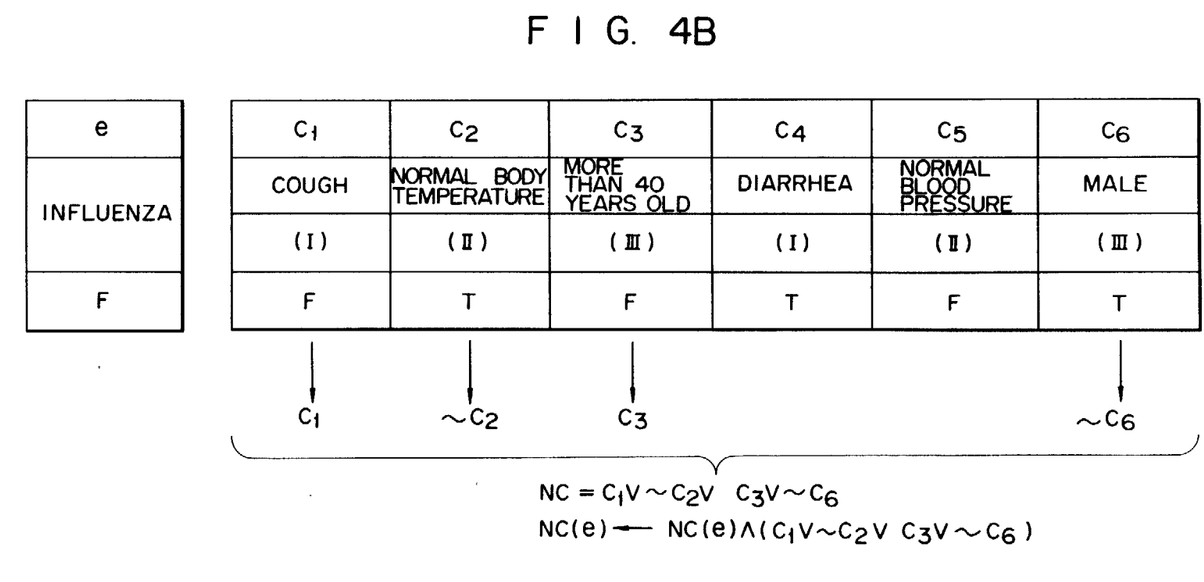
FIG. 4B is a table of a detailed example for obtaining a necessary condition using the apparatus of the present invention.

FIGS. 4A and 4B are tables for explaining the above embodiment in more detail. In terms of "INFLUENZA" as proposition e, conditions C1: COUGH, C2: NORMAL BODY TEMPERATURE, C3: MORE THAN 40 YEARS OLD, C4: DIARRHEA, C5: NORMAL BLOOD PRESSURE, C6: MALE are examined as conditions for a patient who has influenza. Since condition C1: COUGH is a condition for the truth of influenza, its tendency is (I). Since condition C2: NORMAL BODY TEMPERATURE is a condition for the falsity of influenza, its tendency is (II). Since condition C3: MORE THAN 40 YEARS OLD is an unknown factor for the truth or falsity of influenza, its tendency is (III). Since condition C4: DIARRHEA is a condition for the truth of influenza, its tendency is (I). Since condition C5: NORMAL BLOOD PRESSURE is a condition for the falsity of influenza, its tendency is (II). Since condition C6: MALE is an unknown factor for the truth or falsity of influenza, its tendency is (III). (e=T, $C_1$=T, $C_2$=T, $C_3$=T, $C_4$=F, $C_5$=F, $C_6$=F) in FIG. 4A and (e=F, $C_1$=F, $C_2$=T, $C_3$=F, $C_4$=T, $C_5$=F, $C_6$=T) in FIG. 4B are called as example data In FIGS. 4A and 4B, if proposition e or conditions C1 to C6 are true, this is indicated by T, and if proposition e or conditions C1 to C6 are false, this is indicated by F.

Conditions for the truth of influenza will now be examined with reference to FIG. 4A. Assume that proposition e is true (e =T), and that conditions C1, C2, and C3 are true (T) ($C_1$ =T, $C_2$ =T, $C_3$ =T). Also assume that conditions C4, C5, and C6 are false (F) ($C_4$=F, $C_5$=F, $C_6$=F). In this case, the sufficient condition for the truth of influenza, i.e., conditions C1, C3, ~C5, and ~C6, can be extracted. Therefore, the sufficient condition for the truth of influenza is expressed by the logical product of C1, C3, ~C5, ~C6:

$$SC = C1 \wedge C3 \wedge \sim C5 \wedge \sim C6$$

This condition is added to the sufficient condition SC(e) for the truth of influenza, and SC(e) is expressed by:

$$SC(e) \leftarrow SC(e) \vee (C1 \wedge C3 \wedge \sim C5 \wedge \sim C6)$$

Therefore, in the case of FIG. 4A, when conditions C1 and C3 are true (T), and when conditions C5 and C6 are false (F), proposition e (influenza) is true regardless of other conditions C2 and C4.

Next, conditions for the falsity of influenza will be examined with reference to FIG. 4B. In this example, influenza is false (e=F), conditions C1, C3, and C5 are false (C1=F, C3=F, C5=F), and conditions C2, C4, and C6 are true (C2=T, C4=T, C6=T).

In this case, conditions C1, ~C2, C3, and ~C6 can be extracted as conditions for the falsity of proposition e. Therefore, the necessary condition for the truth of influenza is expressed by the logical sum of C1, ~C2, C3, and ~C6:

$$NC = C1 \vee \sim C2 \vee C3 \vee \sim C6$$

This condition is logically ANDed to obtain necessary condition NC(e) for the truth of influenza:

$$NC(e) \leftarrow NC(e) \wedge (C1 \vee \sim C2 \vee C3 \vee \sim C6)$$

Therefore, as can be understood from FIG. 4B, if proposition e (influenza) is true, at least condition C1 or C3 is true, or condition C2 or C6 is false.

In this manner, when the tendency of each of conditions C1 to C6 and the example are given, the sufficient condition and the necessary condition for the truth of the proposition (influenza) can be induced.

The necessary condition and sufficient condition induced as above are stored in memory 14 as expert knowledge. When an unknown example of proposition e and the truth or falsity information of its conditions are input, the truth or falsity of proposition e in this example is judged by judging section 18 as follows.

Figure 5:
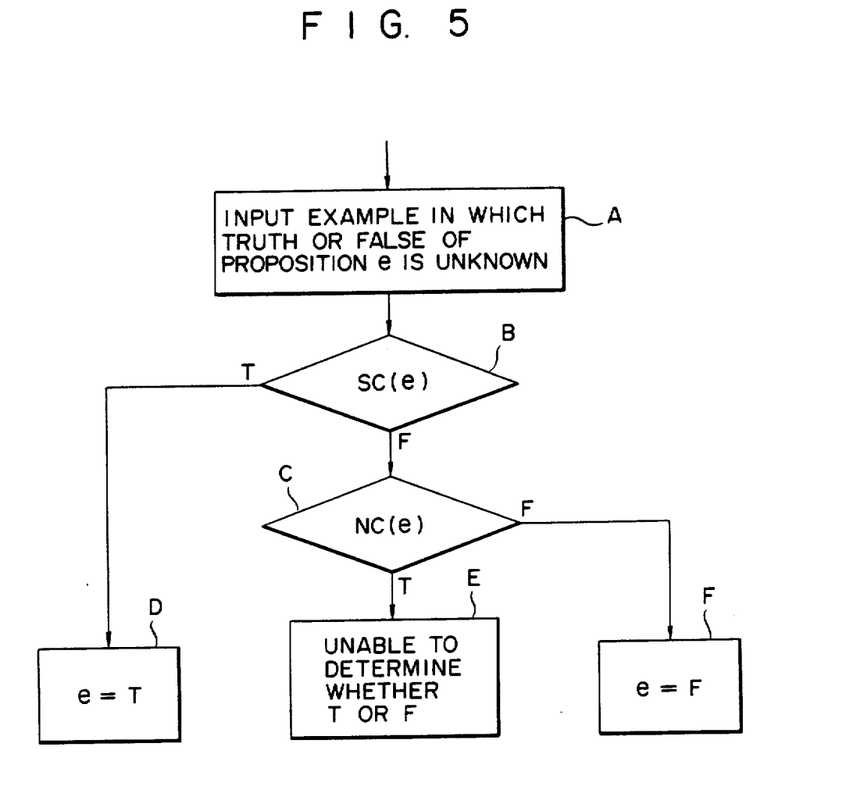
FIG. 5 is a flow chart of judging processing in a judging section in the apparatus of the present invention.

FIG. 5 is a flow chart of judging processing. First, an example in which the truth or falsity of proposition e is unknown is read from memory 14 in step A. Sufficient condition SC(e) and necessary condition NC(e) associated with the same proposition e stored in memory 14 are also read out in step A. These conditions NC(e) and SC(e) are compared with the truth or falsity of the input conditions, in steps B and C.

When the input example satisfies sufficient condition SC(e), the conclusion that proposition e is true is output as "true" in step D. However, when the input example does not satisfy sufficient condition SC(e) and satisfies only necessary condition NC(e), the conclusion that proposition e cannot be induced due to insufficient knowledge is output as "unknown" in step E.

When the input example does not satisfy both sufficient and necessary conditions SC(e) and NC(e), the conclusion that proposition e is false is output as "false" in step F.

In this way, the condition for determining the truth or falsity of proposition e, which is true in accordance with the combination of conditions, can be effectively induced from the example. In addition, induction can be easily performed with high precision without requiring expert knowledge. In terms of an example in which the truth or falsity of proposition e is unknown, the truth or falsity of the proposition e can be effectively induced using the induced and updated necessary condition and sufficient condition.

Therefore, knowledge information can be easily collected, and only appropriate knowledge information can be obtained in accordance with the example, resulting in great practical advantages for knowledge information processing.

The present invention is not limited to the above embodiment. The number of conditions for determining the truth of falsity of proposition e can be determined in accordance with the proposition. When the number of conditions is increased, and when architecture of the conditions is complicated, proposition e can be divided into several subsystems in order to hierarchically process it. In this case, transient assumptions can be obtained for each subsystem, and proposition truth conditions can be obtained from the assumptions. Various changes and modifications may be made within the spirit and scope of the invention.

What is claimed is:

1. An inductive inference method for obtaining necessary and sufficient conditions represented by propositional logic in a computerized expert system by inducing expert knowledge necessary for knowledge information processing, comprising the steps of:

(1) reading into the computer an initial necessary condition and an initial sufficient condition stored in a memory of said expert system;

(2) reading example data from said memory, said example data having proposition, conditions of said proposition and tendency of each condition, said proposition and conditions having truth or falsity, said tendency having a first tendency (I), a second (II) or a third (III), said first tendency positively supporting the truth of the proposition, said second tendency positively supporting the falsity of the proposition, and said third tendency not positively supporting the truth or falsity of the proposition;

(3) obtaining a necessary condition and a sufficient condition based on the following result such that when the proposition is false, said necessary condition is obtained by logically ORing said initial necessary condition and said condition having the falsity and said tendency (I), by logically ORing said initial necessary condition and a logically negated condition of said condition having the truth and said tendency (II), by logically ORing said initial necessary condition and said condition having the falsity and said tendency (III), and by logically ORing said initial necessary condition and a logically negated condition of said condition having the truth and said tendency (III), and when the proposition is true, said sufficient condition is obtained by logically ANDing said initial sufficient condition and said condition having the truth and said tendency (I), by logically ANDing said initial sufficient condition and a logically negated condition of said condition and a logically negated condition of said condition having the falsity and said tendency (I), by logically ANDing said initial sufficient condition and said condition having the truth and said tendency (III), and by logically ANDing said initial sufficient condition and a logically negated condition of said condition having the falsity and said tendency (III); and (4) repeating said steps (2) and (3) for another example data to obtain updated necessary condition and sufficient condition, by using said necessary condition and said sufficient condition as said initial necessary condition and said initial sufficient condition, respectively, in step (3).

2. The method according to claim 1, wherein said sufficient condition for the truth of said proposition is obtained by ORing all information for constituting said sufficient condition.

3. The method according to claim 1, wherein said necessary condition for the falsity of said proposition is obtained by ANDing all information for constituting the necessary conditions.

4. The method according to claim 1, further comprising the step of judging that said proposition is true when conditions of an example in which the truth or falsity of said proposition is unknown satisfy the sufficient condition, that said proposition is false when the conditions of said example satisfy neither the sufficient nor necessary condition, and that the truth or falsity of said proposition is unkown when the conditions of said example satisfy said necessary condition and do not satisfy the sufficient condition.

* * * * *